Sept. 28, 1965 S. E. SMITH 3,209,271

PHASE-LOCKED LOOPS

Filed Aug. 17, 1961 2 Sheets-Sheet 1

INVENTOR
SYDNEY E. SMITH

BY Hurvitz and Rose

ATTORNEYS

INVENTOR
SYDNEY E. SMITH
BY Hurvitz and Rose
ATTORNEYS

United States Patent Office 3,209,271

Patented Sept. 28, 1965

3,209,271

PHASE-LOCKED LOOPS

Sydney E. Smith, Eau Gallie, Fla., assignor to Radiation, Incorporated, Melbourne, Fla., a corporation of Florida Filed Aug. 17, 1961, Ser. No. 132,239

19 Claims. (Cl. 329—122)

The present invention relates to receivers and other equipment employing phase locked demodulator loops and more particularly to a method and apparatus for varying the bandwidth of phase locked demodulator loops to an optimum value in accordance with input signal magnitude and/or noise content in the received signal.

The performance of phase locked demodulator loops is related to the noise content of the signal applied thereto in such a manner that the output signal thereof fluctuates in amplitude and frequency in an undesirable manner due to the noise level. Such variations due to instability overcome some of the advantages usually associated with phase locked demodulators to a certain extent. I have observed that optimum performance of phase locked demodulators may be obtained by varying loop bandwidth in accordance with signal amplitude and/or signal to noise ratio. With large amplitude or good signal to noise ratio signals, large loop bandwidth is required to obtain maximum signal lock in range. Weak signals or those having a low signal to noise ratio to the demodulator, however, require a reducing of loop bandwidth to achieve greatest reduction in improvement threshold of an F.M. receiver.

In the present invention, the loop bandwidth may be controlled in response to signal level or signal to noise ratio at the detector input or output terminals, from the loop filter output signal or any other suitable point in the receiver. Loop bandwidth is controlled with a filter having an electronically controlled bandwidth or it may be controlled by varying loop gain. In a large number of circuits it is considerably easier to provide amplitude rather than filter bandwidth variation in response to rapidly varying signals, thus enhancing the latter procedure in many situations.

My invention employs a phase locked loop containing a phase detector or signal multiplier responsive to the demodulator input signal and the local oscillator output signal. A phase detector is utilized if the phase locked loop is employed with an F.M. receiver while the signal multiplier is employed with A.M. systems to provide an output signal indicative of the deviation between the phases of the received and local oscillator signals. With both types of structures the output signal is zero when the two signals are in phase quadrature and is maximum when they are in phase.

The phase detector output signal is supplied through a loop filter to a voltage controlled local oscillator, which may be of the reactance tube type. With zero input signal, the oscillator output frequency when combined with an unmodulated receiver input signal in the detector, is such as to provide a detector output signal equal to the loop filter center frequency. Bandwidth of the loop filter is controlled electronically in response to signal amplitude at the input or output terminals of the signal multiplier or phase detector. Also, the loop filter bandwidth may be varied in response to the signal to noise ratio at these points in the circuit. In conventional receivers the loop filter bandwidth may also be controlled in response to the automatic gain control signal. As pointed out above, loop bandwidth, in some embodiments, is controlled as a function of the local oscillator or received signal magnitude applied to the detector. It is also possible to control loop bandwidth strictly as a function of noise amplitude.

It is an object of the present invention to provide a new and improved phase locked loop circuit that performs in optimum manner with signals of high or low relative noise content.

An additional object is to provide a highly stabilized phase locked loop demodulator with loop bandwidth an optimum value for strong or weak signals.

It is a further object of the present invention to provide a phase locked loop having variable bandwidth commensurate with signal amplitude and/or noise content of an intelligence bearing signal in the circuit.

It is another object of the present invention to provide a stabilized phase locked loop wherein loop bandwidth is responsive to the input, output or internal loop signal magnitude and/or signal to noise ratio.

In addition, it is an object to provide a phase locked demodulator for utilization with F.M. signals wherein demodulator loop bandwidth is maximum for large amplitude input signals or signal to noise ratios and is minimum for weak signals to realize the greatest improvement threshold reduction possible.

The above and still further objects, features and advantages of the present invention will become apparent upon consideration of the following detailed description of one specific embodiment thereof, especially when taken in conjunction with the accompanying drawings, wherein.

Figure 1:
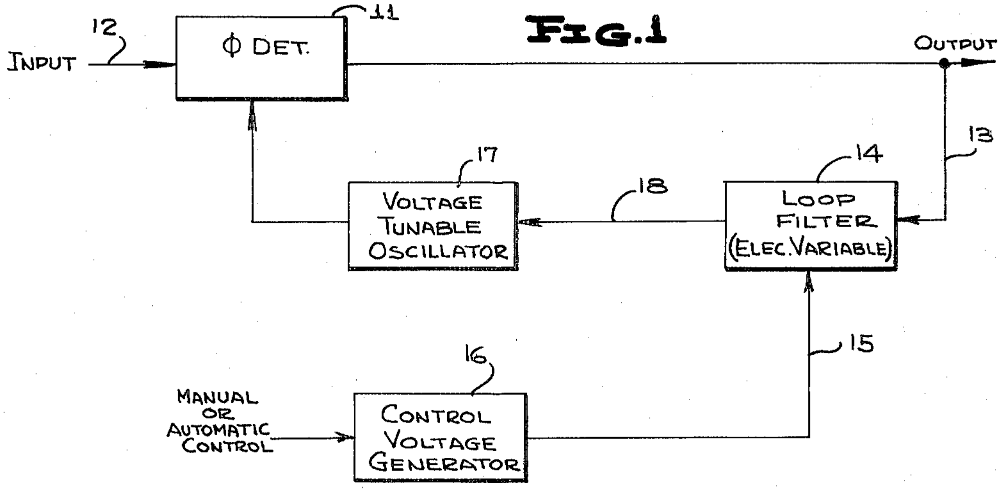
FIGURE 1 is a block diagram of one embodiment of the present invention wherein loop bandwidth is controlled with a variable filter.

FIGURE 1, the block diagram of one preferred embodiment, comprises a conventional phase detector or signal multiplier 11 responsive to an intelligence bearing signal on lead 12 that is either amplitude or frequency modulated in accordance with remotely transmitted intelligence. If the received signal is amplitude modulated, a signal multiplier is employed while a phase detector is utilized with frequency modulation. In either case, the output signal of element 11 is a voltage indicative of the phase difference between the signals supplied thereto so that the circuit may be considered broadly as means for detecting phase. The output signal of detector 11 is supplied via lead 13 to loop filter 14, the bandwidth of which is controlled electronically in a known manner. The bandwidth of filter 14 is controlled by a voltage supplied to it on lead 15 by control voltage generator 16, the input signal of which may be manually or automatically controlled as a function of signal amplitude and/or noise.

The output signal of filter 14 is fed over lead 18 to voltage tunable oscillator 17 which supplies the other input signal to detector 11. With zero voltage supplied to it, oscillator 17 generates a signal equal in frequency to the mean or center frequency of the system input signal on lead 12, i.e. the carrier frequency of the received signal. As the voltage magnitude generated by filter 14 varies, the oscillator 17 frequency varies in attempting to stay in phase quadrature with the signal on lead 12, thereby tending to drive the signal on lead 13 to zero amplitude.

Control for generator 16 is effected by supplying signals thereto indicative of the signal amplitude on leads 12, 13 or 18. This may be accomplished automatically, as described in connection with FIGURE 2 or the signal amplitude may be measured with a suitable meter and the voltage generated by unit 16 controlled by hand. For large level signals, the voltage on lead 15 is of such value as to cause filter 14 to be of maximum bandwidth. This is necessary in order to insure maximum lock-in range of oscillator 17 with the received signal. For weak signals, the bandwidth of filter 14 is narrowed to realize the greatest reduction in improvement-threshold the phase-lock system is capable of achieving when employed with F.M. receivers.

The bandwidth of filter 14 may be controlled by the signal to noise ratio of the signal on any of leads 12, 13 or 18 rather than the signal amplitude on these leads. Signal to noise ratio control may be desired over strictly amplitude control when the system is receiving high noise content energy, as frequently found in telemetry applications. For large signal to noise ratios the filter is maintained at a wide bandwidth and for poor signal to noise ratios, bandwidth is decreased so excess noise does not appear in the system output signal. Control of filter 14 by generator 16 is either automatic or manual, in a similar manner to the strictly amplitude control, discussed above.

It is possible to obtain the filter control signals from other intelligence bearing signals in the receiver than those specifically disclosed. For instance, the A.G.C. voltage in a standard receiver may be employed as the signal amplitude control for generator 16.

Bandwidth control in response to both signal amplitude and signal to noise ratio may be desirable for fading signals with high noise content. In such cases, both amplitude and signal to noise ratio control signals are generated in response to the received signal. It is not necessary for the control signals to be derived from the same point in the circuit in such a case, e.g., the signal amplitude signal may be derived from the input signal to detector 11 and the signal to noise ratio signal from the detector output voltage.

Figure 2:
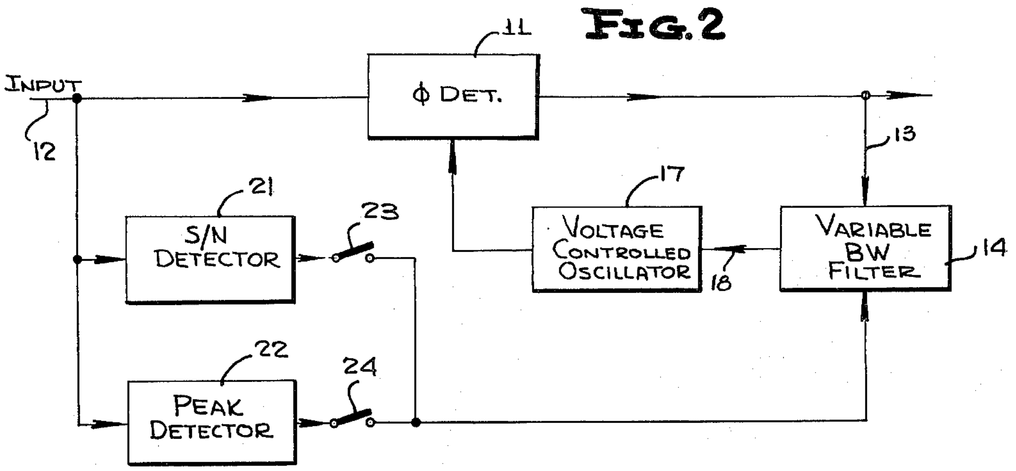
FIGURE 2 is a schematic diagram more specifically illustrating one example of the phase locked loop generally illustrated in FIGURE 1.

FIGURE 2 specifically illustrates an embodiment of the invention, of the type illustrated in FIGURE 1, for demodulating an F.M. signal having appreciable noise level supplied to the system on lead 12. The input signal is coupled in parallel to phase detector 11, signal to noise ratio detector 21 and peak signal detector 22.

Phase detector 11 operates in response to the variable frequency output signal of oscillator 17 and the input signal in the same manner as the detector of FIGURE 1. Signal to noise ratio detector 21 generates a D.C. voltage indicative of the signal to noise ratio of the received signal on lead 12 and peak signal amplitude detector 22 generates a D.C. voltage indicative of the maximum amplitude of the received signal. The output voltages of detectors 21 and 22 are supplied to variable bandwidth filter 14 through switches 23 and 24, respectively. The output signal of detectors 21 and 22 may be combined to control the bandwidth of a single element of filter 14 or each output signal may be employed to control a separate filter element.

For large amplitude and large signal noise ratio signals, the output voltages of detectors 22 and 21 are relatively great to increase the bandwidth of filter 18, and for weak signals having poor signal to noise ratios filter bandwidth is reduced, as described in connection with FIGURE 1, above. If the input signal is of large amplitude but of poor signal to noise ratio, the bandwidth of filter 14 is maintained at an intermediate value.

To close only switch 23 and rely solely on signal to noise ratio control or to close only switch 24 and rely on amplitude control or to close both switches, depends on the nature of the signal received. With fading signals having good signal to noise ratio, switch 24 only need be closed, while switch 23 is the only switch which must be closed for strong signals with high noise content. If the signal is fading and is of low signal to noise ratio, both switches 23 and 24 are closed by the operator.

The amplitude of the output signal derived from filter 14 controls oscillator 17 and phase detector 11 in the manner described in connection with FIGURE 1. The output voltage of filter 14 on lead 18 is a stabilized signal with minimum noise content, commensurate with the modulation imposed on the received signal supplied to the system on lead 12.

Figure 3:
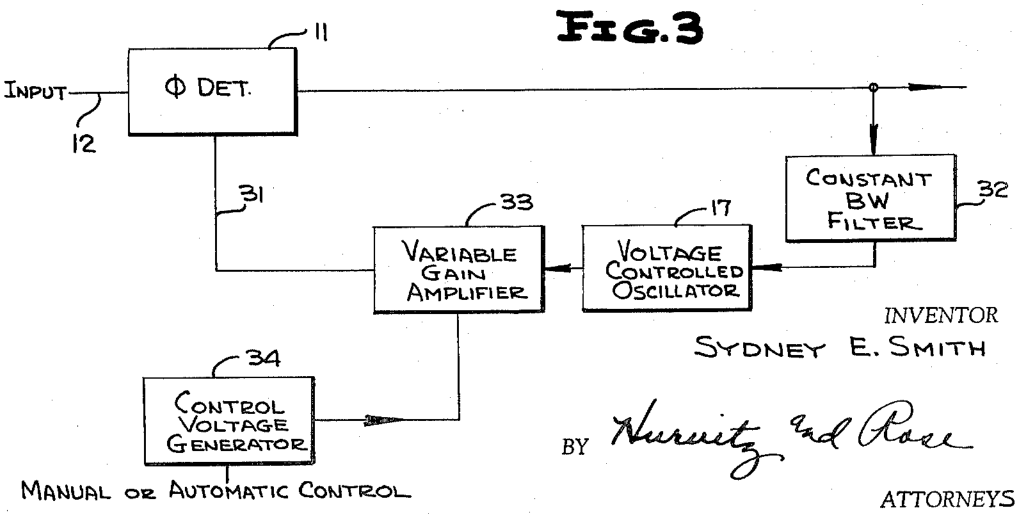
FIGURE 3 is a schematic diagram of another embodiment of the present invention wherein loop bandwidth is controlled with variable gain amplifiers.

FIGURE 3 discloses another embodiment of the present invention wherein loop bandwidth is controlled by varying the gain of the feedback loop. The structure of FIGURE 3 is similar to that of FIGURE 1 in that the input signal on lead 12 is combined with the feedback signal on lead 31 in detector 11 which provides an output voltage indicative of the phase difference of the signals applied to it. Output signal from detector 11 is supplied to constant bandwidth filter 32, e.g., an I.F. strip or video amplifier, that controls voltage responsive oscillator 17 in a like manner in which variable filter 14 of FIGURE 1 varies the frequency of oscillator 17. The variable frequency signal generated by oscillator 17 is supplied to variable gain amplifier 33, the gain of which is controlled by the voltage output of generator 34. The magnitude of the voltage deriving from generator 34 is controlled in response to the signal amplitude and/or signal to noise ratio of the received signals in a manner similar to that of generator 16, FIGURE 1.

For strong signals of large amplitude or high signal to noise ratios, the voltage output of generator 34 supplies a large bias to amplifier 33 to maintain it at high gain. Providing amplifier 33 with high gain level is equivalent to increasing loop bandwidth because the net loop voltage output vs. frequency characteristic is maintained at a high level, i.e., signals on lead 31 over a wide frequency range are of sufficient magnitude to control operation of detector 11. For weak signals or those having poor signal to noise ratios, the output signal of generator 34 is decreased, resulting in reduced gain of amplifier 33. By reducing the gain of amplifier 33, the voltage vs. frequency characteristic of the loop is translated to a lower level and only signals on lead 31 in a narrower band are of sufficient magnitude to affect operation of detector 11.

Figure 4:
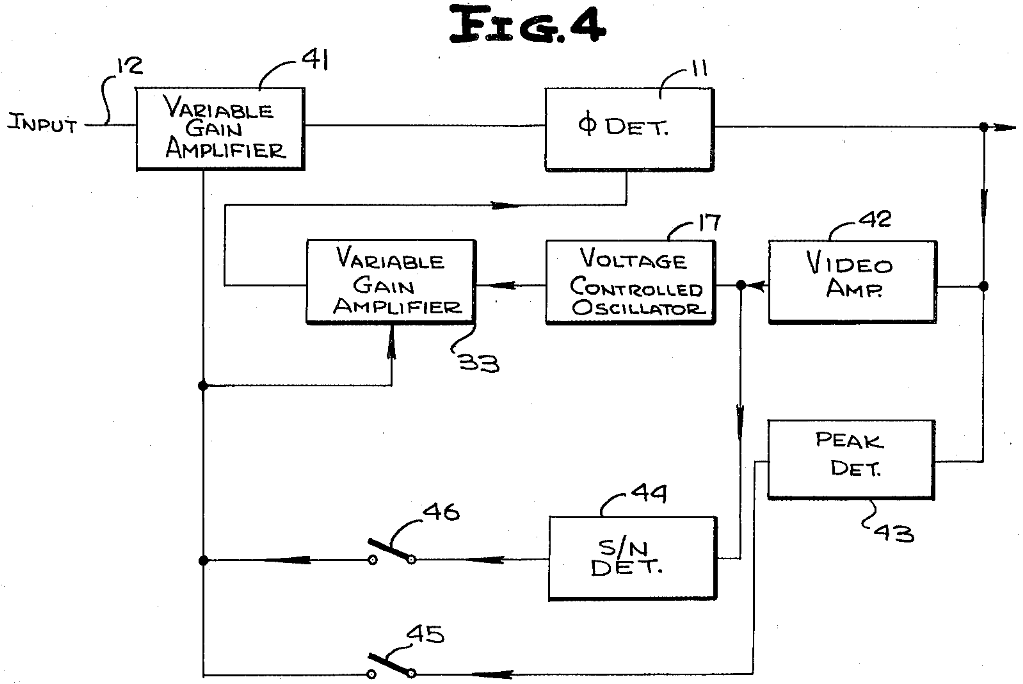
FIGURE 4 is a schematic diagram more specifically illustrating one example of the phase locked loop generally illustrated in FIGURE 3.

FIGURE 4 discloses a specific embodiment of the type of phase locked loop illustrated in FIGURE 3 for demodulating a F.M. signal supplied to the system on lead 12. The input signal is supplied to phase detector 11 through variable gain amplifier 41, the purpose of which is described infra. The phase detector 11 output signal is supplied in parallel to video amplifier 42, corresponding to loop filter 32, FIGURE 3, and peak signal detector which generates a D.C. voltage indicative of the output signal level of detector 11. The output signal of amplifier 42 is supplied in parallel to signal to noise ratio detector 44 and voltage responsive oscillator 17, which generates a variable frequency output signal as described in connection with FIGURE 1. The output signal of oscillator 17 is fed through variable gain amplifier 33 to phase detector 11 in an identical manner to that of the system of FIGURE 3. Amplifier 33 effectively controls loop bandwidth in response to the average value of the D.C. output voltages of detectors 43 and 44 supplied thereto through switches 45 and 46, respectively. Detector 44 is supplied with an attenuator so its output signal is of the same order of magnitude as the output signal of detector 43, to compensate for the signal amplification introduced by video amplifier 42.

The output signals of detectors 43 and 44 control variable gain amplifier 41 in the same manner as the gain of amplifier 33 is varied. By varying both input signals of detector 11 so they will be of the same order of magnitude, the detector functions with a high degree of accuracy. For large signal amplitudes or signal to noise ratios, detectors 43 and 44 generate output signals to provide amplifiers 33 and 41 with large gains. Conversely, low amplitude or signal to noise ratio signals supplied to the detectors cause them to generate signals to reduce the amplifier gain and loop bandwidth. If the output signal of detector 11 is of large magnitude while the signal to noise ratio from video amplifier 42 poor, amplifiers 33 and 41 are set at an intermediate gain because the detector output signals tend to compensate each other. As in FIGURE 2, the connection of detectors 43 and 44 by means of their associated switches 45 and 46 to the loop bandwidth varying apparatus is dependent on the nature of the signal.

Figure 5:
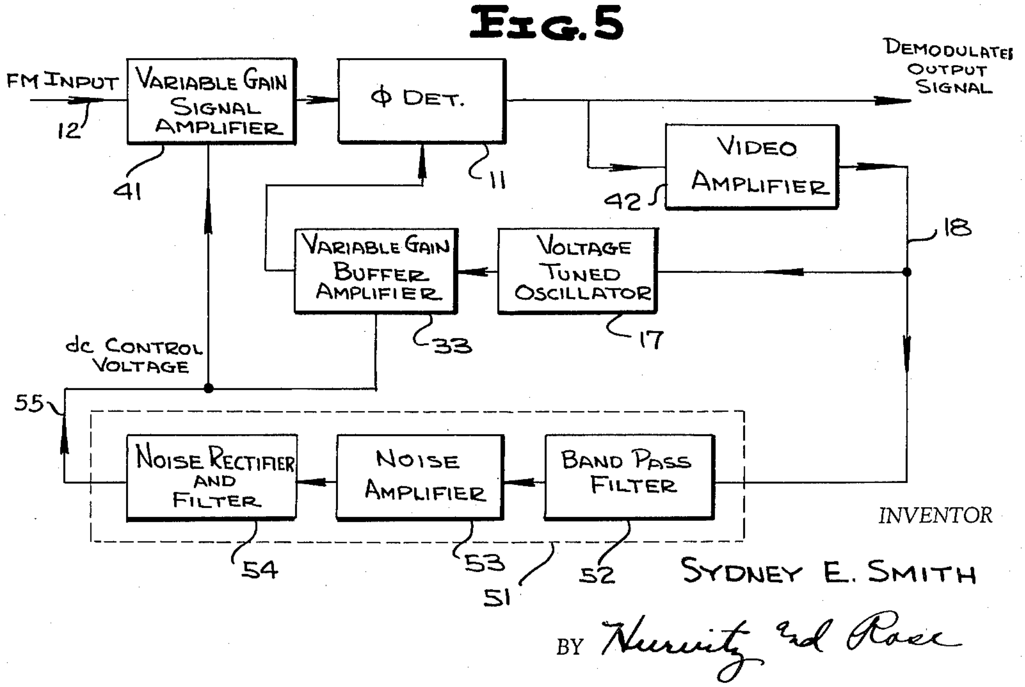
FIGURE 5 is a schematic diagram of another specific embodiment of the type of phase locked loop generally indicated in FIGURE 3.

FIGURE 5 of the drawings is an illustration of another embodiment of the type phase locked loop illustrated generally in FIGURE 3 wherein loop bandwidth is controlled as a function of noise only. As in the system of FIGURE 4, an F.M. input signal having noise content is supplied to variable gain amplifier 41, phase detector 11, and video amplifier 42 via lead 12. The output signal amplitude of amplifier 42 varies the frequency of oscillator 17, the output voltage of which is supplied through variable gain amplifier 33 to phase detector 11 in the same manner as the similar apparatus of FIGURE 4.

In FIGURE 5, however, gain control of amplifiers 33 and 41 is obtained by feeding the output signal of video amplifier 42 to noise detector 51 which generates a signal on lead 55, indicative solely of the noise content in the output signal of the video amplifier. As the noise content of the signal on lead 18 increases, the negative value of the gain control voltage supplied to amplifiers 41 and 33 from noise detector 51 increases, thereby decreasing amplifier gain and narrowing the system bandwidth.

Noise detector 51 consists of bandpass filter 52, designed to have a pass band above that of video amplifier 42 so only noise influences its output signal. Of course it is to be understood that the band pass of filter 52 is not so much greater than the high frequency cut off of amplifier 42 as to prevent the noise components supplied through the latter to reach the former. The noise from filter 52 output terminals is supplied through a suitable amplifier 53 to rectifier and filter 54 which converts it into a negative D.C. voltage.

The fact that the output signal of noise detector 51 is indicative solely of noise and is not a function of signal to noise ratio is not detrimental for many F.M. receiving applications because once the receiver is tuned to the proper carrier frequency, there is little possibility of a complete loss of input signal and the noise content of the signal is a relatively accurate indication of signal to noise ratio.

While I have described and illustrated one specific embodiment of my invention, it will be clear that variations of the details of construction which are specifically illustrated and described may be resorted to without departing from the true spirit and scope of the invention as defined in the appended claims.

I claim:

1. A phase locked demodulator loop for variable frequency intelligence bearing input signals comprising an oscillator, means for generating an intelligence bearing signal responsive to the phase difference between the input and oscillator signals, said last named means having an input terminal responsive to said oscillator signal and an output terminal supplied by the phase responsive signal, means for controlling the frequency of the oscillator signal in response to said phase responsive signal, said oscillator and frequency controlling means being included in the signal path between said input and output terminals, and means for effectively varying the bandwidth of the signal path including said oscillator between said input and output terminals as a function of the noise content of at least one of said intelligence bearing signals.

2. The apparatus of claim 1 wherein said bandwidth is narrowed in response to large noise content and widened in response to small noise content in at least one of said intelligence bearing signals.

3. A phase locked demodulator loop for variable frequency intelligence bearing input signals comprising an oscillator, means for generating an intelligence bearing signal responsive to the phase difference between the input and oscillator signals, said last named means having an input terminal responsive to said oscillator signal and an output terminal supplied by the phase responsive signal, means for controlling the frequency of the oscillator signal in response to said phase responsive signal, said oscillator and frequency controlling means being included in the signal path between said input and output terminals, and means for effectively varying the bandwidth of the signal path including said oscillator between said input and output terminals as a function of the signal amplitude and the noise content of at least one of said intelligence bearing signals.

4. The apparatus of claim 3 wherein said bandwidth is varied in response to signal to noise ratio of at least one of said intelligence bearing signals, said bandwidth being narrowed in response to small signal to noise ratios and widened in response to large signal to noise ratios of at least one of said intelligence bearing signals.

5. A phase locked demodulator loop for variable frequency intelligence bearing input signals comprising an oscillator, means for generating an intelligence bearing signal responsive to the phase difference between the input and oscillator signals, said last-named means having an input terminal responsive to said oscillator signal and an output terminal supplied by the phase responsive signal, means for controlling the frequency of the oscillator signal in response to said phase responsive signal, said oscillator and frequency controlling means being included in the signal path between said input and output terminals, and means for effectively varying the bandwidth of the signal path including said oscillator between said input and output terminals as a function of the signal amplitude level of at least one of said intelligence bearing signals, said bandwidth being narrowed in response to small amplitude signals and widened in response to large amplitude signals of said at least one intelligence bearing signals.

6. The apparatus of claim 1 wherein said bandwidth varying means includes means for varying the amplitude of said oscillator signal to said input terminal, the gain of said last named means being varied as a function of the noise content of at least one of said intelligence bearing signals.

7. The apparatus of claim 1 wherein said bandwidth varying means includes a variable bandwidth filter for supplying said phase responsive signal to said oscillator, the output signal of said filter being an intelligence bearing signal, the bandwidth of said filter being varied as a function of the noise content of at least one of said intelligence bearing signals.

8. A phase locked demodulator for a F.M. signal comprising a variable frequency oscillator, a phase detector for generating a D.C. signal responsive to the frequency difference between said F.M. signal and the oscillator signal, a video amplifier for amplifying the D.C. signal, the oscillator frequency being controlled by the amplitude of the video amplifier output signal, and means responsive to the noise content of the video amplifier output signal for varying the amplitude of the oscillator signal supplied to said phase detector, said last named means being varied to supply an oscillator signal of large amplitude to said phase detector in response to low noise content of the video amplifier output signal and to supply an oscillator signal of small amplitude to said phase detector in response to large noise content of the video amplifier output signal.

9. A receiver responsive to a variable frequency intelligence bearing input signal including a phase locked demodulator loop, said demodulator comprising an oscillator, means for generating an intelligence bearing signal responsive to the phase difference between the input and oscillator signals, said last-named means having an input terminal responsive to said oscillator signal and an output terminal supplied by the phase responsive signal, means for controlling the frequency of the oscillator signal in response to said phase responsive signal, said oscillator and frequency controlling means being included in the signal path between said input and output terminals, and means for effectively varying the bandwidth of the signal path including said oscillator between said input and output terminals as a function of the amplitude level of at least one of the intelligence bearing signals in said receiver, said bandwidth being narrowed in response to small amplitude intelligence bearing signals and widened in response to large amplitude intelligence bearing signals.

10. A system for demodulating a modulated signal comprising local oscillator means for deriving another signal, means responsive to said another and said modulated signals for deriving an output of variable amplitude indicative of the phase difference between said another and modulated signals, means for controlling the frequency of said oscillator means in response to the amplitude of said output, and means for varying the bandwidth of said local oscillator means inversely as a function of the noise content of an intelligence bearing signal in the system.

11. The system of claim 10 wherein said noise content function is a function of signal to noise ratio.

12. The system of claim 10 wherein said means for varying comprises a variable bandwidth filter coupled to said oscillator means.

13. The system of claim 10 wherein said means for varying comprises a variable gain amplifier coupled to said oscillator means.

14. The system of claim 10 wherein said noise content function is only a function of noise of an intelligence bearing signal in the system.

15. The system of claim 10 further including means for varying the bandwidth of said local oscillator means as a function of the signal strength of an intelligence bearing signal in the system.

16. The system of claim 10 further including means for varying the amplitude of the modulated signal coupled to said means for deriving inversely in accordance with said function.

17. A system for demodulating a modulated signal comprising local oscillator means for deriving another signal, means responsive to said another and said modulated signals for deriving an output of variable amplitude indicative of the phase difference between said another and modulated signals, means for controlling the frequency of said oscillator means in response to the amplitude of said output, and means for varying the bandwidth of said local oscillator means as a function of the signal strength of an intelligence bearing signal in the system, said bandwidth being narrowed and widened in response to small and large amplitudes of said intelligence bearing signal, respectively.

18. A system for demodulating a modulated signal comprising local oscillator means for deriving another signal, means responsive to said another and said modulated signals for deriving an output of variable amplitude indicative of the phase difference between said another and modulated signals, means for controlling the frequency of said oscillator means in response to the amplitude of said output, and means responsive to an intelligence bearing signal in the system for varying the bandwidth of said local oscillator means inversely as a function of the noise content of said intelligence bearing signal.

19. A system for demodulating a modulated signal, comprising local oscillator means for deriving another signal, means responsive to said another and said modulated signals for deriving an output of variable amplitude indicative of the phase difference between said another and modulated signals, means for controlling the frequency of said oscillator means in response to the amplitude of said output, and means responsive to an intelligence bearing signal in the system for varying the bandwidth of said local oscillator means as a function of the signal strength of said intelligence bearing signal, said bandwidth being narrowed and widened in response to weak and strong signals, respectively.

References Cited by the Examiner

UNITED STATES PATENTS

| | | | |
|---|---|---|---|
| 2,058,411 | 10/36 | Carlson | 325—417 X |
| 2,453,988 | 11/48 | Guanella | 325—417 X |
| 2,462,759 | 2/49 | McCoy | 329—122 X |
| 2,560,313 | 7/51 | Tellier | 325—417 X |
| 2,624,006 | 12/52 | Oltuis et al. | 329—122 X |
| 3,069,625 | 12/62 | Morita et al. | 325—346 X |

ROY LAKE, *Primary Examiner.*

ARTHUR GAUSS, *Examiner.*